US008364495B2

(12) United States Patent
Morii

(10) Patent No.: US 8,364,495 B2
(45) Date of Patent: *Jan. 29, 2013

(54) VOICE ENCODING DEVICE, VOICE DECODING DEVICE, AND METHODS THEREFOR

(75) Inventor: Toshiyuki Morii, Osaka (JP)

(73) Assignee: Panasonic Corporation, Osaka (JP)

( * ) Notice: Subject to any disclaimer, the term of this patent is extended or adjusted under 35 U.S.C. 154(b) by 1153 days.

This patent is subject to a terminal disclaimer.

(21) Appl. No.: 11/574,543

(22) PCT Filed: Sep. 1, 2005

(86) PCT No.: PCT/JP2005/016033

§ 371 (c)(1),
(2), (4) Date: Mar. 1, 2007

(87) PCT Pub. No.: WO2006/025502

PCT Pub. Date: Mar. 9, 2006

(65) Prior Publication Data

US 2007/0271102 A1 Nov. 22, 2007

(30) Foreign Application Priority Data

Sep. 2, 2004 (JP) ................................ 2004-256037

(51) Int. Cl.
*G10L 19/00* (2006.01)
*G10L 19/14* (2006.01)
*G10L 11/04* (2006.01)
*G10L 19/02* (2006.01)
*H04L 27/00* (2006.01)
*H04J 3/02* (2006.01)

(52) U.S. Cl. ........ 704/500; 704/205; 704/207; 704/219; 704/220; 704/229; 704/201; 375/259; 370/538

(58) Field of Classification Search ........... 704/E19.044, 704/500, 222, 223, 219, 220
See application file for complete search history.

(56) References Cited

U.S. PATENT DOCUMENTS 5,353,373 A * 10/1994 Drogo de Iacovo et al. . 704/223
(Continued)

FOREIGN PATENT DOCUMENTS

JP 11/30997 2/1999
JP 2003-323199 11/2003

OTHER PUBLICATIONS

Park, Sung-Hee; Kim, Yeon-Bae; Seo, Yang-Scock. Multi-Layer Bit-Sliced Bit-Rate Scalable Audio Coding. AES Convention:103 (Sep. 1997). Paper No. 4520.*

(Continued)

*Primary Examiner* — Paras D Shah
*Assistant Examiner* — Matthew Baker
(74) *Attorney, Agent, or Firm* — Dickinson Wright PLLC

(57) ABSTRACT

An encoding device capable of realizing a scalable CODEC of a high performance. In this encoding device, an LPC analyzing unit (551) analyzes an input voice (301) efficiently with a synthesized LPC parameter obtained from a core decoder (305), to acquire an encoded LPC coefficient. An adaptive code note (552) is stored with its sound source codes, as acquired from the core decoder (305). The adaptive code note (552) and a stochastic code note (553) send sound source samples to a gain adjusting unit (554). This gain adjusting unit (554) multiplies the individual sound source samples by an amplification based on the gain parameters acquired from the core decoder (305), and then adds the products to acquire sound source vectors. These vectors are sent to an LPC synthesizing unit (555). This LPC synthesizing unit (555) filters the sound source vectors acquired at the gain adjusting unit (554), with the LPC parameter, to acquire a synthetic signal.

10 Claims, 6 Drawing Sheets

U.S. PATENT DOCUMENTS

| | | | | |
|---|---|---|---|---|
| 6,092,041 | A * | 7/2000 | Pan et al. | 704/229 |
| 6,208,957 | B1 | 3/2001 | Nomura | |
| 6,349,284 | B1 * | 2/2002 | Park et al. | 704/500 |
| 6,446,037 | B1 * | 9/2002 | Fielder et al. | 704/229 |
| 6,615,169 | B1 * | 9/2003 | Ojala et al. | 704/205 |
| 7,072,366 | B2 * | 7/2006 | Parkkinen et al. | 370/538 |
| 7,272,555 | B2 * | 9/2007 | Lee et al. | 704/219 |
| 7,277,849 | B2 * | 10/2007 | Streich et al. | 704/229 |
| 7,299,174 | B2 * | 11/2007 | Sato et al. | 704/219 |
| 7,596,491 | B1 * | 9/2009 | Stachurski | 704/219 |
| 7,606,703 | B2 * | 10/2009 | Unno | 704/219 |
| 7,752,052 | B2 | 7/2010 | Oshikiri | |
| 7,835,904 | B2 * | 11/2010 | Li et al. | 704/200.1 |
| 7,978,771 | B2 * | 7/2011 | Sato et al. | 375/259 |
| 7,991,611 | B2 * | 8/2011 | Ehara et al. | 704/205 |
| 8,099,275 | B2 * | 1/2012 | Oshikiri | 704/206 |
| 2002/0107686 | A1 * | 8/2002 | Unno | 704/219 |
| 2003/0206558 | A1 * | 11/2003 | Parkkinen et al. | 370/477 |
| 2003/0220783 | A1 * | 11/2003 | Streich et al. | 704/200.1 |
| 2004/0161043 | A1 | 8/2004 | Nomura | |
| 2005/0010404 | A1 * | 1/2005 | Son et al. | 704/219 |
| 2005/0197833 | A1 * | 9/2005 | Yasunaga et al. | 704/223 |
| 2006/0122830 | A1 * | 6/2006 | Lee et al. | 704/229 |

OTHER PUBLICATIONS

PCT International Search Report dated Nov. 1, 2005.

A. Kataoka, et al.; "G.729 o Kosei Yoso to shite Mochiiru Scalable Kotaiiki Onsei Fugoka", The Transactions of the Institute of Electronics, Information and Communication Engineers D-II, vol. J86-D-II, No. 3, pp. 379-387, Mar. 1, 2003.

T. Moria, et al.;,"MPEG-4 TwinVQ ni yoru Ayamari Taisei Scalable Fugoka", Information Procesbing Society of Japan Kenkyu Hokoki, [MUSic and computer 34-7], vol. 2000, No. 19, pp. 41-46, Feb. 17, 2000.

European Search Report dated Apr. 21, 2008.

J. Herre, et al., "Overview of MPEG-4 Aud io and its Applications in Mobile Communications," International Conference on Communication Technology Proceedings, vol. 1, Beijing, China, Aug. 21, 2000, pp. 604-613.

C. Erdmann, et al., "Pyramid CELP: Embedded Speech Coding for Packet Communications," IEEE International Conference on Acoustics, Speech, and Signal Processing, vol. 4 of 4, Orlando, Florida, May 13, 2002, pp. 181-184.

S. Ramprashad, "High Quality Embedded, Wideband Speech Coding Using an Inherently Layered Coding Paradigm," International Conference on Acoustics, Speech and Signal Processing, vol. 2, Istanbul, Turkey, Jun. 5, 2000, pp. 1145-1146.

F. Chen et al., "CELP Based Speech Coding with Fine Granularity Scalability," IEEE International-Conference on Acoustics, Speech, and Signal Processing, vol. 1 of 6, Hong Kong, Apr. 6, 2003, pp. 145-148.

Office Action in the corresponding Japanese Patent Application dated Aug. 24, 2010.

* cited by examiner

VOICE ENCODING DEVICE, VOICE DECODING DEVICE, AND METHODS THEREFOR

TECHNICAL FIELD

The present invention relates to a speech coding apparatus and speech decoding apparatus used in a communication system that codes and transmits speech and audio signals, and methods therefor.

BACKGROUND ART

In recent years, owing to the spread of the third generation mobile telephone, personal speech communication has entered a new era. In addition, services for sending speech using packet communication, such as that of the IP telephone, have expanded, with a fourth generation mobile telephone that is expected to be in service in 2010 headed toward telephone connection using total IP packet communication. This service is designed to provide seamless communication between different types of networks, requiring speech codec that supports various transmission capacities. Multiple compression rate codec, such as the ETSI-standard AMR, is available, but requires speech communication not susceptible to sound quality deterioration by transcodec during communication between different networks where a reduction in transmission capacity during transmission is often desired. Here, in recent years, scalable codec has been the subject of research and development at manufacturer locations and carrier and other research institutes around the world, becoming an issue even in ITU-T standardization (ITU-T SG16, WP3, Q.9 "EV" and Q.10 "G.729EV").

Scalable codec is a codec that first codes data using a core coder and next finds in an enhancement coder an enhancement code that, when added to the required code in the core coder, further improves sound quality, thereby increasing the bit rate as this process is repeated in a step-wise fashion. For example, given three coders (4 kbps core coder, 3 kbps enhancement coder 1, 2.5 kbps enhancement coder 2), speech of the three bit rates 4 kbps, 7 kbps, and 9.5 kbps can be output.

In scalable codec, the bit rate can be changed during transmission, enabling speech output after decoding only the 4 kbps code of the core coder or only the 7 kbps code of the core coder and enhancement coder 1 during 9.5 kbps transmission using the above-mentioned three coders. Thus, scalable codec enables communication between different networks without transcodec mediation.

The basic structure of scalable codec is a multistage or component type structure. The multistage structure, which enables identification of coding distortion in each coder, is possibly more effective than the component structure and has the potential to become mainstream in the future.

In Non-patent Document 1, a two-layer scalable codec employing ITU-G standard G.729 as the core coder and the algorithm thereof are disclosed. Non-patent Document 1 describes how to utilize the code of a core coder in an enhancement coder for component type scalable codec. In particular, the document describes the effectiveness of the performance of the pitch auxiliary. Non-Patent Document 1: Akitoshi Kataoka and Shinji Mori, "Scalable Broadband Speech Coding Using G.729 as Structure Member," IEICE Transactions D-II, Vol. J86-D-11, No. 3, pp. 379 to 387 (March 2003)

DISCLOSURE OF THE INVENTION

Problems to be Solved by the Invention

Nevertheless, in conventional multi-stage scalable codec, the problem exists that a method for utilizing the information obtained by decoding the code of lower layers (core coder and lower enhancement coders) has not been established, resulting in a sound quality that is not sufficiently improved.

It is therefore an object of the present invention to provide a speech coding apparatus and a speech decoding apparatus capable of realizing a scalable codec of a high performance and methods therefor.

Means for Solving the Problem

The speech coding apparatus of the present invention codes an input signal using coding means divided into a plurality layers, and comprises decoding means for decoding coded information obtained through coding in the coding means of at least one layer, with each coding means employing a configuration that performs a coding process utilizing information obtained through decoding in the decoding means coded information obtained through coding in the lower layer coding means.

The speech decoding apparatus of the present invention decodes in decoding means on a per layer basis coded information divided into a plurality layers, with each decoding means employing a configuration that performs a decoding process utilizing the information obtained through decoding in the lower layer decoding means.

The speech coding method of the present invention codes an input signal using the coded information of n layers (where n is an integer greater than or equal to 2), and comprises a base layer coding process that codes an input signal to generate the coded information of layer 1, a decoding process of layer i that decodes the coded information of layer i (where i is an integer greater than or equal to 1 and less than or equal to n-1) to generate a decoded signal of layer i, an addition process that finds either the differential signal of layer 1, which is the difference between the input signal and the decoded signal of layer 1, or the differential signal of layer i, which is the difference between the decoded signal of layer (i−1) and the decoded signal of layer i, and an enhancement layer coding process of layer (i+1) that codes the differential signal of layer i to generate the coded information of layer (i+1), with the enhancement layer coding process of layer (i+1) employing a method for performing a coding process utilizing the information of the decoding process of layer i.

The speech decoding apparatus of the present invention decodes the coded information of n layers (where n is an integer greater than or equal to 2), and comprises a base layer decoding process that decodes the inputted coded information of layer 1, a decoding process of layer i that decodes the coded information of layer (i+1) (where i is an integer greater than or equal to 1 and less than or equal to n−1) to generate a decoded signal of layer (i+1), and an addition process that adds the decoded signal of each layer, with the decoding process of layer (i+1) employing a method for performing a decoding process utilizing the information of the decoding process of layer i.

Advantageous Effect of the Invention

The present invention effectively utilizes information obtained through decoding lower layer codes, achieving a high performance for component type scalable codec as well as multistage type scalable codec, which conventionally lacked in performance.

BEST MODE FOR CARRYING OUT THE INVENTION

The essential feature of the present invention is the utilization of information obtained through decoding the code of lower layers (core coder, lower enhancement coders) in the coding/decoding of upper enhancement layers in the scalable codec.

In the following descriptions, CELP is used as an example of the coding mode of each coder and decoder used in the core layer and enhancement layers.

Figure 1:
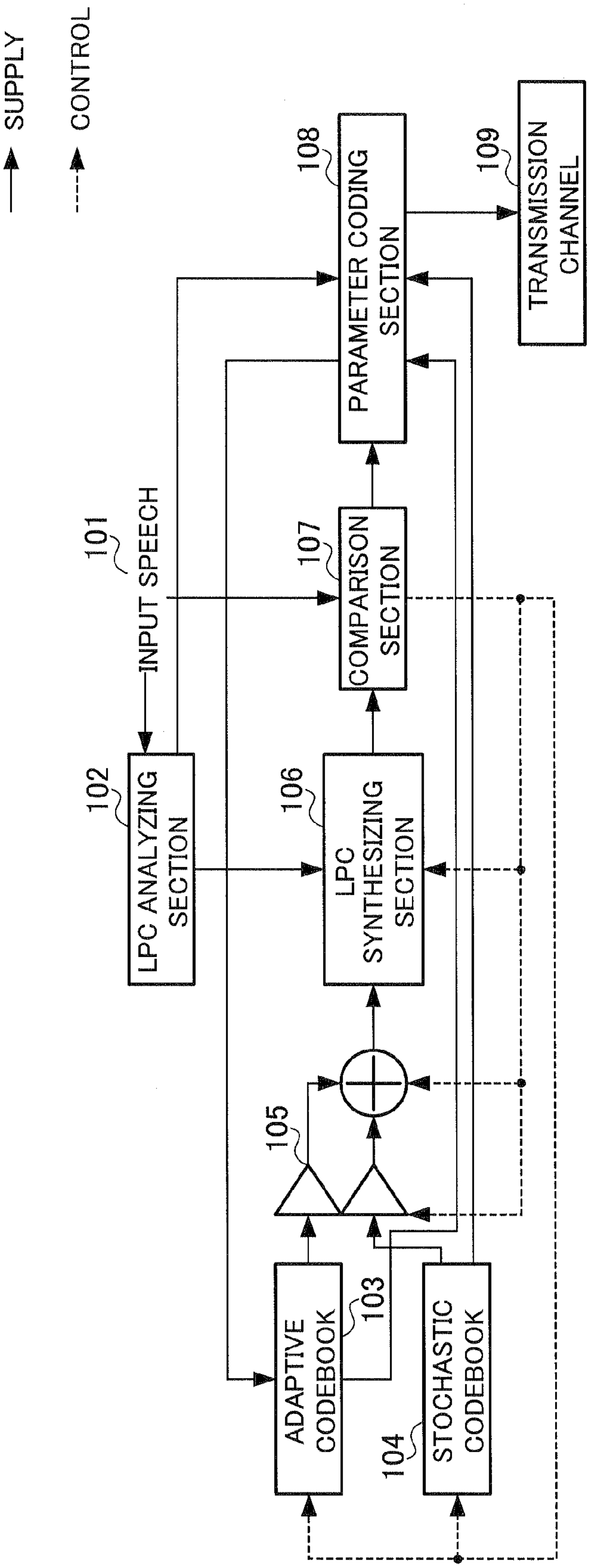
FIG. 1 is a block diagram of a CELP coding apparatus.
Figure 2:
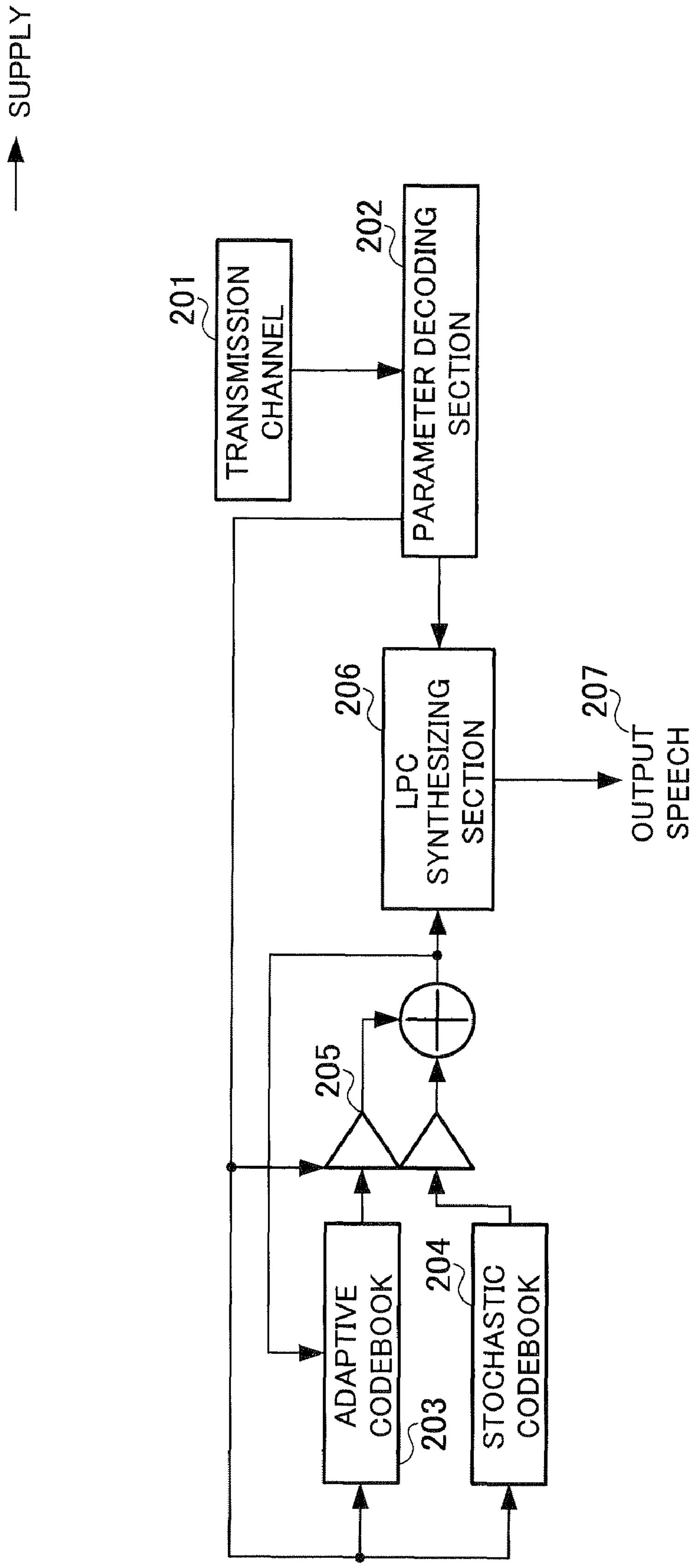
FIG. 2 is a block diagram of a CELP decoding apparatus.

Now CELP, which is the fundamental algorithm of coding/decoding, will be described with reference to FIG. 1 and FIG. 2.

First, the algorithm of the CELP coding apparatus will be described with reference to FIG. 1. FIG. 1 is a block diagram of a coding apparatus in the CELP system.

First, LPC analyzing section 102 executes autocorrection analysis and LPC analysis on input speech 101 to obtain the LPC coefficients, codes the LPC coefficients to obtain the LPC code, and then decodes the LPC code to obtain the decoded LPC coefficients. This coding, in many cases, is done by converting the values to readily quantized parameters such as PARCOR coefficients, LSP, or ISP, and then by prediction and vector quantization based on past decoded parameters.

Next, specified excitation samples stored in adaptive codebook 103 and stochastic codebook 104 (respectively referred to as an adaptive code vector or adaptive excitation and stochastic code vector or stochastic excitation) are fetched and gain adjustment section 105 multiplies each excitation sample by a specified amplification, adding the products to obtain excitation vectors.

Next, LPC synthesizing section 106 synthesizes the excitation vectors obtained in gain adjustment section 105 using an all-pole filter based on the LPC parameter to obtain a synthetic signal. However, in actual coding, the two excitation vectors (adaptive excitation, stochastic excitation) prior to gain adjustment are filtered with decoded LPC coefficients found by LPC analyzing section 103 to obtain two synthetic signals. This is done in order to conduct more efficient excitation coding.

Next, comparison section 107 calculates the distance between the synthetic signal found in LPC synthesizing section 106 and the input speech and, by controlling the output vectors from the two codebooks and the amplification applied in gain adjustment section 105, finds a combination of two excitation codes whose distance is the smallest.

However, in actual coding, typically coding apparatus analyzes the relationship between the input speech and two synthetic signals obtained in LPC synthesizing section 106 to find an optimal value (optimal gain) for two synthetic signals, adds each of the synthetic signals respectively subjected to gain adjustment in gain adjustment section 105 according to the optimal gain to find a total synthetic signal, and calculates the distance between the total synthetic signal and the input speech. Next, coding apparatus further calculates, with respect to all excitation samples in adaptive codebook 103 and stochastic codebook 104, the distance between the input speech and each of many other synthetic signals obtained by functioning gain adjustment section 105 and LPC synthesizing section 106, and finds an index of the excitation sample whose distance is the smallest. As a result, the excitation codes of the two codebooks can be searched efficiently.

In this excitation search, simultaneously optimizing the adaptive codebook and stochastic codebook is impractical due to the great amount of calculations required, and thus an open loop search that determines the codes one at a time is typically conducted. Coding apparatus is finding the codes of the adaptive codebook by comparing the input speech with the synthetic signals of adaptive excitation only, finding the codes of the stochastic codebook by subsequently fixing the excitations from this adaptive codebook, controlling the excitation samples from the stochastic codebook, finding the many total synthetic signals by optimal gain combination, and comparing these with the input speech. Searches in current small processors (such as DSP) are realized based on this procedure.

Then, comparison section 107 sends the indices (codes) of the two codebooks, the two synthetic signals corresponding to the indices, and the input speech to parameter coding section 108.

Parameter coding section 108 codes the gain based on the correlation between the two synthetic signals and input speech to obtains the gain code. Then, parameter coding section 108 puts together and sends the LPC code and the indices (excitation codes) of the excitation samples of the two codebooks to transmission channel 109. Further, parameter coding section 108 decodes the excitation signal using the gain code and two excitation samples corresponding to the respective excitation code and stores the excitation signal in adaptive codebook 103. At this time, the old excitation samples are discarded. That is, the decoded excitation data of adaptive codebook 103 are subjected to a memory shift from future to past, the old data removed from memory are discarded, and the excitation signal created by decoding is stored in the emptied future section. This process is referred to as an adaptive codebook status update.

Furthermore, the LPC synthesis during the excitation search in LPC synthesizing section 106 typically uses linear prediction coefficients, a high-band enhancement filter, or an auditory weighting filter with long-term prediction coefficients (which are obtained by the long-term prediction analysis of input speech). In addition, the excitation search on adaptive codebook 103 and stochastic codebook 104 is often performed at an interval (called sub-frame) obtained by further dividing an analysis interval (called frame).

Here, as described in the above explanation, in order to search through all of the excitations of adaptive codebook 103 and stochastic codebook 104 obtained from gain adjustment section 105 using a feasible amount of calculations, comparison section 107 searches for two excitations (adaptive codebook 103 and stochastic codebook 104) using an open loop. In this case, the role of each block (section) becomes more complicated than described above. Now, the processing procedure will be described in further detail.

(1) First, gain adjustment section 105 sends excitation samples (adaptive excitation) one after the other from adaptive codebook 103 only, activates LPC synthesizing section 106 to find synthetic signals, sends the synthetic signals to comparison section 107 for comparison with the input speech, and selects the optimal codes of adaptive codebook 103. This search is performed while presuming that the gain at this time is the value with the least amount of coding distortion (optimal gain).

(2) Then, gain adjustment section 105 fixes the codes of adaptive codebook 103, selects the same excitation samples from adaptive codebook 103 and the excitation samples (stochastic excitation samples) corresponding to the codes of comparison section 107 from stochastic codebook 104 one after the other, and sends the result to LPC synthesizing section 106. LPC synthesizing section 106 finds two synthetic signals and comparison section 107 compares the sum of the two synthetic signals with the input speech and selects the codes of stochastic codebook 104. This search, similar to the above, is performed while presuming that the gain at this time is the value with the least amount of coding distortion (optimal gain).

Furthermore, in the above open loop search, a function that adjusts the gain of gain adjustment section 105 and an adding function are not used.

This algorithm, in comparison to a method that searches for all excitation combinations of the respective codebooks, exhibits as lightly inferior coding function but greatly reduces the amount of calculations to within a feasible range.

In this manner, CELP is coding based on a model of the human speech vocalization process (vocal cord wave=excitation, vocal tract=LPC synthesis filter), enabling presentation of good quality speech using a relatively low amount of calculations when used as a fundamental algorithm.

Next, the algorithm of the CELP decoding apparatus will be described with reference to FIG. 2. FIG. 2 is a block diagram of a decoding apparatus in a CELP system.

Parameter decoding section 202 decodes LPC code sent via transmission channel 201 to obtain LPC parameter for synthesis, and sends the parameter to LPC synthesizing section 206. In addition, parameter decoding section 202 sends the two excitation codes sent via transmission channel 201 to adaptive codebook 203 and stochastic codebook 204, and specifies the excitation samples to be output. Parameter decoding section 202 also decodes the gain code sent via transmission channel 201 to obtain the gain parameter, and sends the gain parameter to gain adjustment section 205.

Next, adaptive codebook 203 and stochastic codebook 204 output and send the excitation samples specified by the two excitation codes to gain adjustment section 205. Gain adjustment section 205 multiplies each of the excitation samples obtained from the two excitation codebooks by the gain parameter obtained from parameter decoding section 202, adds the products to find the excitation vectors, and sends the excitation vectors to LPC synthesizing section 206.

LPC synthesizing section 206 filters the excitation vectors with the LPC parameter for synthesis to find a synthetic signal, and identifies this synthetic signal as output speech 207. Furthermore, after this synthesis, a post filter that performs a process such as pole enhancement or high-band enhancement based on the parameters for synthesis is often used.

This concludes the description of the fundamental algorithm CELP.

Next, the configuration of the coding apparatus and decoding apparatus of the scalable codec according to an embodiment of the present invention will be described in detail with reference to the accompanying drawings.

In the present embodiment, a multistage type scalable codec is described as an example. The example described is for the case where there are two layers: a core layer and an enhancement layer.

In addition, in the present embodiment, a frequency scalable mode with different acoustic bands of speech in cases where a core layer and enhancement layer have been added is used as an example of the coding mode that determines the sound quality of the scalable codec. In this mode, in comparison to the speech of a narrow acoustic frequency band obtained with core codec alone, high quality speech of a broad frequency band is obtained by adding the code of the enhancement section. Furthermore, in order to realize “frequency scalable,” a frequency adjustment section that converts the sampling frequency of the synthetic signal and input speech is used.

Figure 3:
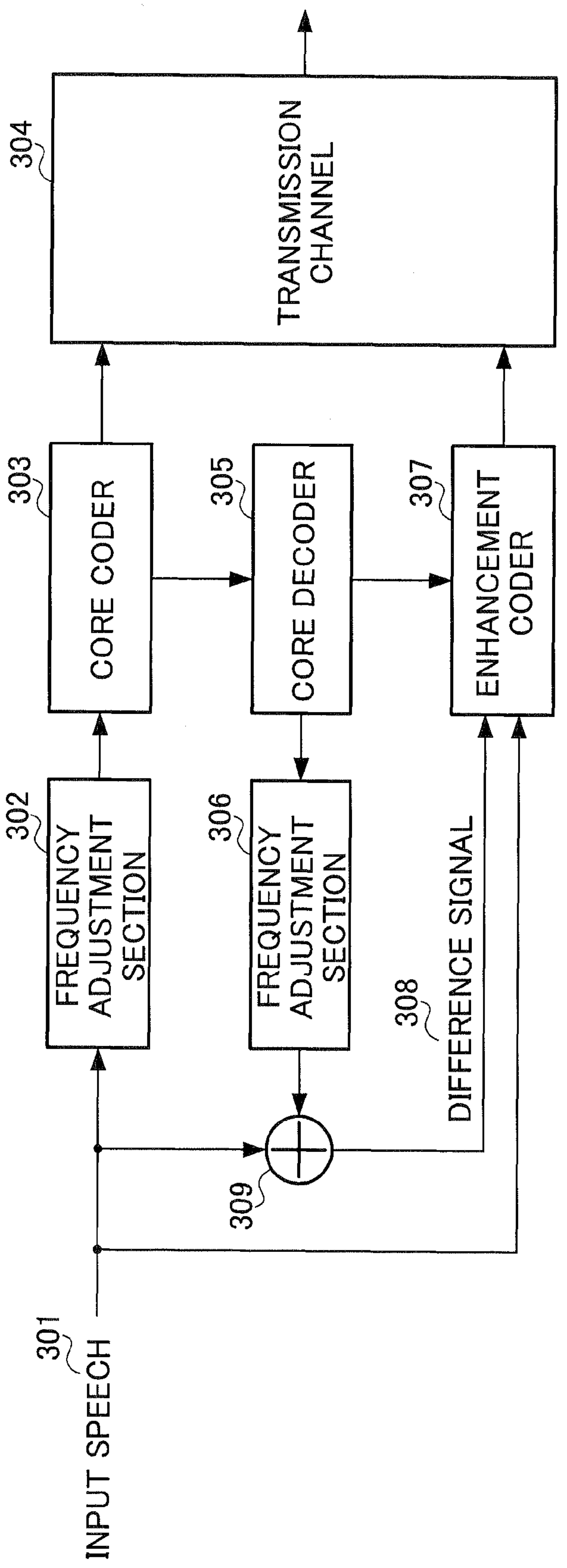
FIG. 3 is a block diagram showing the configuration of the coding apparatus of the scalable codec according to an embodiment of the present invention.

Now, the configuration of the coding apparatus of the scalable codec according to an embodiment of the present invention will be described in detail with reference to the FIG. 3.

Frequency adjustment section 302 down-samples input speech 301 and sends the obtained narrow band speech signals to core coder 303. There are various methods of down-sampling including, for instance, the method of sampling by applying a low-pass filter. For example, when the input speech of 16 kHz sampling is converted to 8 kHz sampling, a low-pass filter that minimizes the frequency components of 4 kHz (8 kHz sampling Nyquist frequency) or higher is applied and subsequently every other signal is obtained (one out of two is sampled) and stored in memory to obtain the signals of 8 kHz sampling.

Next, core coder 303 codes the narrow band speech signals and sends the obtained codes to transmission channel 304 and core decoder 305.

Core decoder 305 decodes the signals using the code obtained in core coder 303, and sends the obtained synthetic signals to frequency adjustment section 306. In addition, core decoder 305 sends the parameters obtained in the decoding process to enhancement coder 307 as necessary.

Frequency adjustment section 306 upsamples the synthetic signals obtained in core decoder 305 up to the sampling rate of input speech 301, and sends the samples to addition section 309. There are various methods of upsampling including, for instance, inserting 0 between each sample to increase the number of samples, adjusting the frequency component using a low-pass filter, and then adjusting the power. For example, when 8 kHz sampling is up-sampled to 16 kHz sampling, as shown in equation (1), first 0 is inserted after every other sample to obtain the signal Yj and to find the amplitude p per sample.

$Xi$ ($i$ = 1 to $I$): Output series (synthetic signal) of core decoder A15 — Equation [1]

$$Yj = \begin{cases} Xj/2 & \text{(when } j \text{ is an even number)} \quad (j = 1 \text{ to } 2I) \\ 0 & \text{(when } j \text{ is an odd number)} \end{cases}$$

-continued $$p = \sqrt{\frac{\sum_{I=1}^{I} Xi \times Xi}{I}}$$

Next, Yi is filtered using the low-pass filter to minimize the 8 kHz or higher frequency component. The amplitude q per Zi sample is found for the obtained 16 kHz sampling signal Zi as shown in equation (2) below, the gain is smoothly adjusted so that the value approaches that found in equation (1), and the synthetic signal Wi is obtained.

Equation [2]

$$q = \sqrt{\frac{\sum_{I=1}^{2I} Zi \times Zi}{2I}}$$

The following process is performed until i=1 to 2I $$\begin{cases} g = (g \times 0.99) + (q/p \times 0.01) \\ Wi = Zi \times g \end{cases}$$

Furthermore, in the above, an applicable constant (such as 0) is identified as the initial value of g.

In addition, when the filter used in frequency adjustment section 302, core coder 303, core decoder 305, and frequency adjustment section 306 is a filter with phase component variance, adjustment needs to be made in frequency adjustment section 306 so that the phase component also matches the input speech 301. In this method, the variance of the phase component of the filter up until that time is pre-calculated and, by applying its inverse characteristics to Wi, phase matching is achieved. Phase matching makes it possible to find a pure differential signal of input speech 301 and perform efficient coding in enhancement coder 307.

Addition section 309 inverts the code of the synthetic signal obtained in frequency adjustment section 306 and adds the result to input speech 301, i.e., subtracts the synthetic signal from input speech 301. Addition section 309 send differential signal 308, which is the speech signal obtained in this process, to enhancement coder 307.

Enhancement coder 307 inputs input speech 301 and differential signal 308, utilizes the parameters obtained in core decoder 305 to efficiently code differential signal 308, and sends the obtained code to transmission channel 304.

This concludes the description of the coding apparatus of the scalable codec according to the present embodiment.

Figure 4:
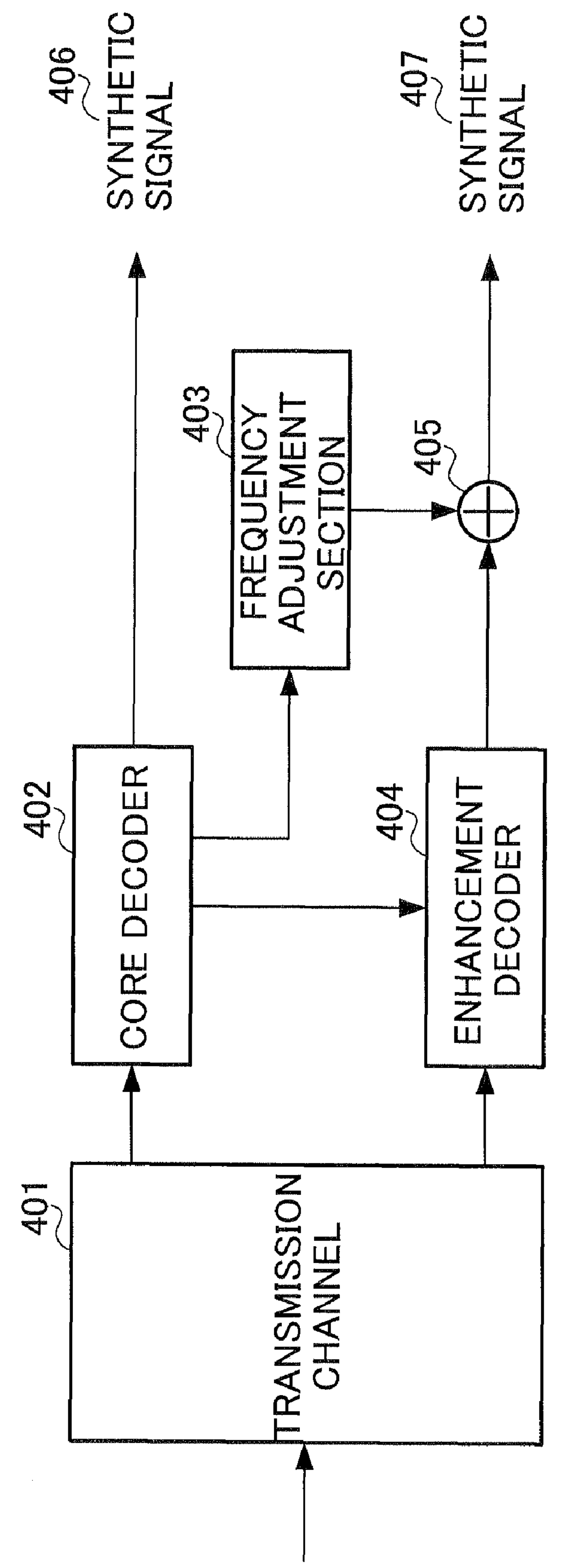
FIG. 4 is a block diagram showing the configuration of the decoding apparatus of the scalable codec according to the above-mentioned embodiment of the present invention.

Next, the configuration of the decoding apparatus of the scalable codec according to an embodiment of the present invention will be described in detail with reference to FIG. 4.

Core decoder 402 obtains the code required for decoding from transmission channel 401 and decodes the code to obtain a synthetic signal. Core decoder 402 comprises a decoding function similar to core decoder 305 of the coding apparatus of FIG. 3. In addition, core decoder 402 outputs synthetic signal 406 as necessary. Furthermore, it is effective to adjust synthetic signal 406 to ensure easy auditory listenability. For example, a post filter based on the parameters decoded in core decoder 402 may be used. In addition, core decoder 402 sends the synthetic signals to frequency adjustment section 403 as necessary. Also, core decoder 402 sends the parameters obtained in the decoding process to enhancement decoder 404 as necessary.

Frequency adjustment section 403 upsamples the synthetic signal obtained from core decoder 402 and sends the synthetic signal after upsampling to addition section 405. The function of frequency adjustment section 403 is the same as that of frequency adjustment section 306 of FIG. 3, and a description thereof is therefore omitted.

Enhancement decoder 404 decodes the codes obtained from transmission channel 401 to obtain a synthetic signal. Then, enhancement decoder 404 sends the obtained synthetic signal to addition section 405. During this decoding, the parameters obtained during the decoding process from core decoder 402 are used, making it possible to obtain a good quality synthetic signal.

Addition section 405 adds the synthetic signal obtained from frequency adjustment section 403 and the synthetic signal obtained from enhancement decoder 404, and outputs synthetic signal 407. Furthermore, it is effective to adjust synthetic signal 407 to ensure easy auditory listenability. For example, a post filter based on the parameters decoded in enhancement decoder 404 may be used.

As described above, the decoding apparatus of FIG. 4 is capable of outputting two synthetic signals: synthetic signal 406 and synthetic signal 407. Synthetic signal 406 is a good quality synthetic signal obtained from the codes from the core layer only, and synthetic signal 407 is a good quality synthetic signal obtained from the codes of the core layer and enhancement layer. The synthetic signal used is determined by the system that uses this scalable. If only synthetic signal 406 of the core layer is used in the system, core decoder 305, frequency adjustment section 306, addition section 309, and enhancement coder 307 of the coding apparatus, and frequency adjustment section 403, enhancement decoder 404, and addition section 405 of the decoding apparatus may be omitted.

This concludes the description of the decoding apparatus of the scalable codec.

Next the method wherein the enhancement coder and enhancement decoder utilize the parameters obtained from the core decoder in the coding apparatus and decoding apparatus of the present embodiment will be described in detail.

Figure 5:
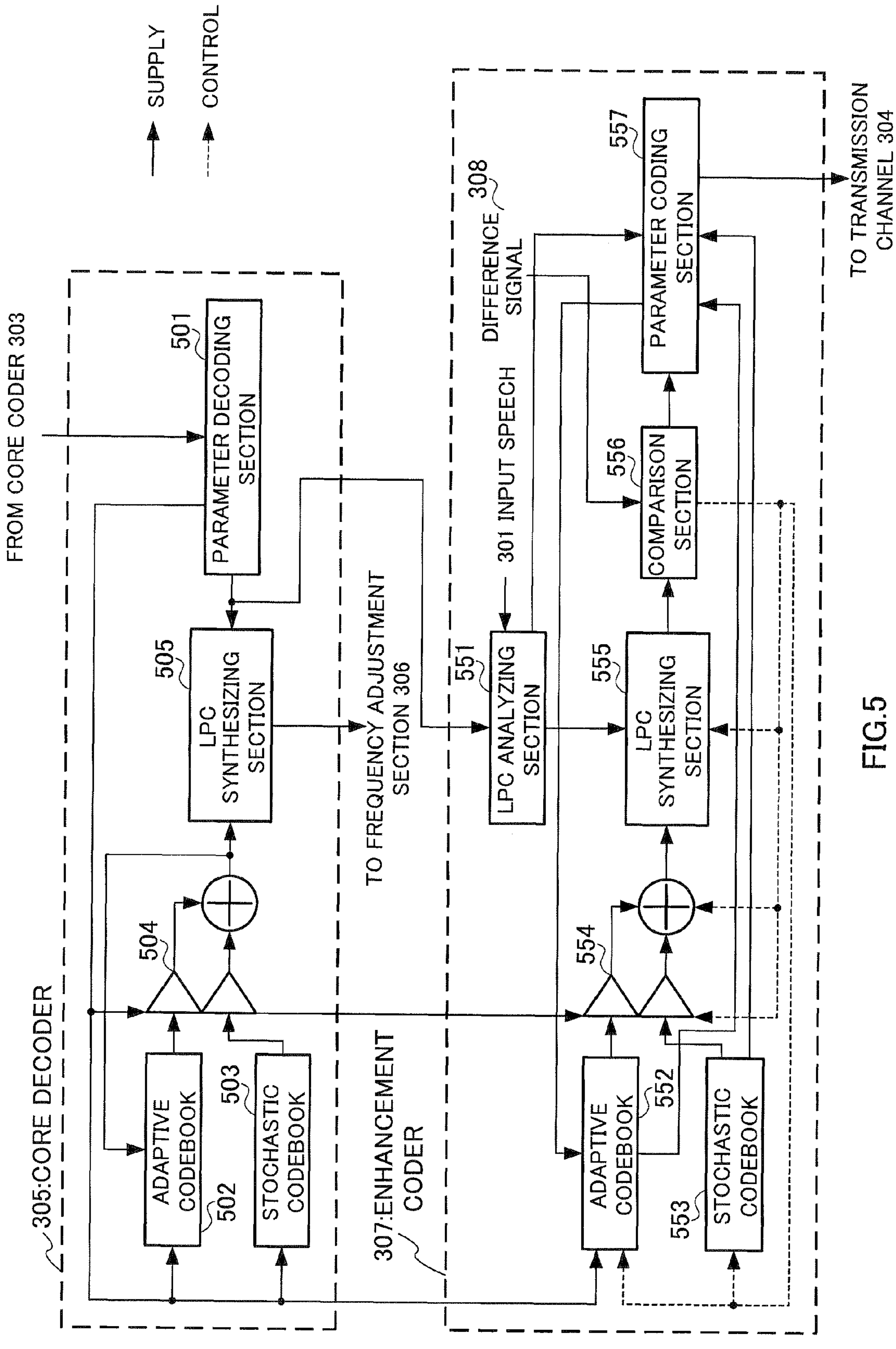
FIG. 5 is a block diagram showing the internal configuration of the core decoder and enhancement coder of the coding apparatus of the scalable codec according to the above-mentioned embodiment of the present invention.

First, the method wherein the enhancement coder of the coding apparatus utilizes the parameters obtained from the core decoder according to the present embodiment will be described with referent to FIG. 5. FIG. 5 is a block diagram showing the configuration of core decoder 305 and enhancement coder 307 of the scalable codec coding apparatus of FIG. 3.

First, the function of core decoder 305 will be described. Parameter decoding section 501 inputs the LPC code, excitation codes of the two codebooks, and gain code from core coder 303. Then, parameter decoding section 501 decodes the LPC code to obtain the LPC parameter for synthesis, and sends the parameter to LPC synthesizing section 505 and LPC analyzing section 551 in enhancement coder 307. In addition, parameter decoding section 501 sends the two excitation codes to adaptive codebook 502, stochastic codebook 503, and adaptive codebook 552 in enhancement coder 307, specifying the excitation samples to be output. Parameter decoding section 501 also decodes the gain code to obtain the gain parameter, and sends the gain parameter to gain adjustment section 504 and gain adjustment section 554 in enhancement coder 307.

Next, adaptive codebook 502 and stochastic codebook 503 send the excitation samples specified by the two excitation codes to gain adjustment section 504. Gain adjustment section 504 multiplies the excitation samples obtained from the two excitation codebooks by the gain parameter obtained from parameter decoding section 401, adds the products, and sends the excitation vectors obtained from this process to LPC synthesizing section 505. LPC synthesizing section 505 filters the excitation vectors with the LPC parameter for synthesis to obtain a synthetic signal, and sends the synthetic signal to frequency adjustment section 306. During this synthesis, the often-used post filter is not used.

Based on the above function of core decoder 305, three types of parameters, i.e., the LPC parameter for synthesis, excitation code of the adaptive codebook, and gain parameter, are sent to enhancement coder 307.

Next, the function of enhancement coder 307 that receives the three types of parameters will be described.

LPC analyzing section 551 executes autocorrection analysis and LPC analysis on input speech 301 to obtain the LPC coefficients, codes the LPC coefficients to obtain the LPC code, and then decodes the obtained LPC code to obtain the decoded LPC coefficients. Furthermore, LPC analyzing section 551 performs efficient quantization using the synthesized LPC parameter obtained from core decoder 305.

Adaptive codebook 552 and stochastic codebook 553 send the excitation samples specified by the two excitation codes to gain adjustment section 554.

Gain adjustment section 554 multiplies each of the excitation samples by the amplification obtained using the gain parameter obtained from core decoder 305, adds the products to obtain excitation vectors, and sends the excitation vectors to LPC synthesizing section 555.

LPC synthesizing section 555 filters the excitation vectors obtained in gain adjustment section 554 with the LPC parameter to obtain a synthetic signal. However, in actual coding, LPC synthesizing section typically filters the two excitation vectors (adaptive excitation, stochastic excitation) prior to gain adjustment using the decoded LPC coefficients obtained in LPC analyzing section 551 to obtain two synthetic signals, and sends the two synthetic signals to comparison section 556. This is done in order to conduct more efficient excitation coding.

Comparison section 556 calculates the distance between differential signal 308 and the synthetic signals obtained in LPC synthesizing section 555 and, by controlling the excitation samples from the two codebooks and the amplification applied in gain adjustment section 554, finds the combination of two excitation codes whose distance is the smallest. However, in actual coding, typically coding apparatus analyzes the relationship between differential signal 308 and two synthetic signals obtained in LPC synthesizing section 555 to find an optimal value (optimal gain) for the two synthetic signals, adds each synthetic signal respectively subjected to gain adjustment with the optimal gain in gain adjustment section 554 to find a total synthetic signal, and calculates the distance between the total synthetic signal and differential signal 308. Coding apparatus further calculates, with respect to all excitation samples in adaptive codebook 552 and stochastic codebook 553, the distance between differential signal 308 and the many synthetic signals obtained by functioning gain adjustment section 554 and LPC synthesizing section 555, compares the obtained distances, and finds the index of the two excitation samples whose distance is the smallest. As a result, the excitation codes of the two codebooks can be searched more efficiently.

In addition, in this excitation search, simultaneously optimizing the adaptive codebook and stochastic codebook is normally impossible due to the great amount of calculations required, and thus an open loop search that determines the codes one at a time is typically conducted. That is, the code of the adaptive codebook is obtained by comparing differential signal 308 with the synthetic signals of adaptive excitation only, and the code of the stochastic codebook is subsequently determined by fixing the excitations from this adaptive codebook, controlling the excitation samples from the stochastic codebook, obtaining many total synthetic signals by combining the optimal gain, and comparing the total synthetic signals with differential signal 308. From a procedure such as the above, a search based on a practical amount of calculations is realized.

Then, comparison section 556 sends the indices (codes) of the two codebooks, the two synthetic signals corresponding to the indices, and differential signal 308 to parameter coding section 557.

Parameter coding section 557 codes the optimal gain based on the correlation between the two synthetic signals and differential signal 308 to obtain the gain code. Then, parameter coding section 557 puts together and sends the LPC code and the indices (excitation codes) of the excitation samples of the two codebooks to transmission channel 304. Further, parameter coding section 557 decodes the excitation signal using the gain code and two excitation samples corresponding to the respective excitation code and stores the excitation signal in adaptive codebook 552. At this time, the old excitation samples are discarded. That is, the decoded excitation data of adaptive codebook 552 are subjected to a memory shift from future to past, the old data are discarded, and the excitation signal created by decoding is stored in the emptied future section. This process is referred to as an adaptive codebook status update.

Next, utilization of each of the three parameters (synthesized LPC parameter, excitation code of adaptive codebook, and gain parameter) obtained from the core layer of enhancement coder 307 will be individually described.

First, the quantization method based on the synthesized LPC parameter will be described in detail.

LPC analyzing section 551 first converts the synthesized LPC parameter of the core layer, taking into consideration the difference in frequency. As stated in the description of the coding apparatus of FIG. 3, given core layer 8 kHz sampling and enhancement layer 16 kHz sampling as an example of a core layer and enhancement layer having different frequency components, the synthesized LPC parameter obtained from the speech signals of 8 kHz sampling need to be changed to 16 kHz sampling. An example of this method will now be described.

The synthesized LPC parameter shall be parameter a of linear predictive analysis. Parameter a is normally found using the Levinson-Durbin method by autocorrection analysis, but since a process based on the recurrence equation is reversible, conversion of parameter a to the autocorrection coefficient is possible by inverse conversion. Here, upsampling may be realized with this autocorrection coefficient.

Given a source signal Xi for finding the autocorrection coefficient, the autocorrection coefficient Vj can be found by the following equation (3).

$$Vj = \sum_i Xi \cdot Xi - j \qquad \text{[Equation 3]}$$

Given that the above Xi is a sample of an even number, the above can be written as shown in equation (4) below.

$$Vj=\sum_i X2i\cdot X2i-2j \quad \text{[Equation 4]}$$

Here, given an autocorrection coefficient Wj when the sampling is expanded two-fold, a difference arises in the order of the even numbers and odd numbers, resulting in the following equation (5).

$$W2j=\sum_i X2i\cdot X2i-2j+\sum_i X2i+1\cdot X2i+1-2j \quad \text{[Equation 5]}$$

$$W2j+1=\sum_i X2i\cdot X2i-2j-1+\sum_i X2i+1\cdot X2i+1-2j-1$$

Here, when multi-layer filter Pm is used to interpolate X of an odd number, the above two equations (4) and (5) change as shown in equation (6) below, and the multi-layer filter interpolates the value of the odd number from the linear sum of X of neighboring even numbers.

$$\begin{aligned} W2j &= \sum_I X2i\cdot X2i-2j+ \\ &\sum_I\Big(\sum_m Pm\cdot X2(i+m)\Big)\cdot \\ &\Big(\sum_n Pn\cdot X2(i+n)-2\Big) \\ &= Vj+\sum_m\sum_n Vj+m-n \\ W2j+1 &= \sum_I X2i\cdot\sum_m Pm\cdot X2(i+m)-2(j+1)+ \\ &\sum_i\sum_m Pn\cdot X2(i+m)\cdot \\ &= \sum_m Pm(Vj+1-m+Vj+m) \end{aligned} \quad \text{[Equation 6]}$$

Thus, if the source autocorrection coefficient Vj has the required order portion, the value can be converted to the autocorrection coefficient Wj of sampling that is double the size based on interpolation. Here, by once again applying the algorithm of the Levinson and Durbin method to the obtained Wj, a sampling rate adjusted parameter a that is applicable in the enhancement layer is obtained.

LPC analyzing section 551 uses the parameter of the core layer found from the above conversion (hereinafter "core coefficient") to quantize the LPC coefficients found from input speech 301. The LPC coefficients are converted to a parameter that is readily quantized, such as PARCORE, LSP, or ISP, and then quantized by vector quantization (VQ), etc. Here, the following two quantization modes will be described as examples.

(1) Coding the difference from the core coefficient (2) Including the core coefficient and coding using predictive VQ First, the quantization mode of (1) will be described.

First, the LPC coefficients that are subject to quantization are converted to a readily quantized parameter (hereinafter "target coefficient"). Next, the core coefficient is subtracted from the target coefficient. Because both are vectors, the subtraction operation is of vectors. Then, the obtained difference vector is quantized by VQ (predictive VQ, split VQ, multistage VQ). At this time, while a method that simply finds the difference is effective, a subtraction operation using each element of the vectors and the corresponding correlation results in a more accurate quantization. An example is shown in equation (7) below.

$$Di=Xi-\beta i\cdot Yi \quad \text{[Equation 7]}$$

Di: Difference vector, Xi: Target coefficient, Yi: Core coefficient, βi: Degree of correlation In the above equation (7), βi uses a stored value statistically found in advance. A method wherein βi is fixed to 1.0 also exists, but results in simple subtraction. The degree of correlation is determined by operating the coding apparatus of the scalable codec using a great amount of speech data in advance, and analyzing the correlation of the many target coefficients and core coefficients input in LPC analyzing section 551 of enhancement coder 307. This can be achieved by finding βi which minimizes error power E of the following equation (8).

$$E=\sum_t\sum_i Dt,i^2=\sum_t\sum_i(Xt,i-\beta i\cdot Yt,i)^2 \quad \text{[Equation 8]}$$

t: Sample number

Then, βi, which minimizes the above, is obtained by equation (9) below based on the property that all i values become 0 in an equation that partially differentiates E by βi.

$$\beta i=\Sigma Xt,i\cdot Yt,i/\rho Yt,i\cdot Yt,i \quad \text{[Equation 9]}$$

Thus, when the above βi is used to obtain the difference, more accurate quantization is achieved.

Next, the quantization mode of (2) will be described.

Predictive VQ, similar to VQ after the above subtraction, refers to the VQ of the difference of the sum of the products obtained using a plurality of decoded parameters of the past and a fixed prediction coefficient. An example of this difference vector is shown in equation (10) below.

$$Di=Xi-\sum_m\delta m,i\cdot Ym,i \quad \text{[Equation 10]}$$

Di: Difference vector, Xi: Target coefficient, Ym, i: Past decoded parameters

δm, i: Prediction coefficient (fixed)

For the above "decoded parameters of the past," two methods are available: using the decoded vector itself or using the centroid of VQ. While the former method offers high prediction capability, the propagation errors are more prolonged, making the latter more resistant to bit errors.

Here, because the core coefficient also exhibits a high degree of correlation with the parameters at that time, always including the core coefficient in Ym, i makes it possible to obtain high prediction capability and, in turn, quantization of an accuracy level that is even higher than that of the quantization mode of the above-mentioned (1). For example, when the centroid is used, the following equation (11) results in the case of prediction order 4.

[Equation 11]

Y0, i: Core coefficient

Y1, i: Previous centroid (or normalized centroid)

Y2, i: Centroid before previous centroid (or normalized centroid)

Y3, i: Centroid before the two previous centroids (or normalized centroid)

Normalization: To match the dynamic range, multiply by:

$$1\Big/\left(1-\sum_{m}\beta m,\, i\right)$$

In addition, the prediction coefficients δm, i, similar to βi of the quantization mode of (1), can be found based on the fact that the value of an equation where the error power of many data is partially differentiated by each prediction coefficient will be zero. In this case, the prediction coefficients δm, i is found by solving the linear simultaneous equation of m.

As described above, the use of the core coefficient obtained in the core layer enables efficient LPC parameter coding.

Furthermore, as a mode of predictive VQ, the centroid is sometimes included in the predictive sum of the products. The method is shown in parentheses in equation 11, and a description thereof is therefore omitted.

Further, LPC analyzing section 551 sends the code obtained from coding to parameter coding section 557. In addition, LPC analyzing section 551 finds and sends the LPC parameter for synthesis of the enhancement coder obtained through decoding the code to LPC synthesizing section 555.

While the analysis target in the above description of LPC analyzing section 551 is input speech 301, parameter extraction and coding can be achieved using the same method with difference signal 308. The algorithm is the same as that when input speech 301 is used, and a description thereof is therefore omitted.

In the conventional multistage type scalable codec, this difference signal 308 is the target of analysis. However, because this is a difference signal, there is the disadvantage of ambiguity as a frequency component. Input speech 301 described in the above explanation is the first input signal to the codec, resulting in a more definite frequency component when analyzed. Thus, the coding of this enables transmission of higher quality speech information.

Next, utilization of the excitation code of the adaptive codebook obtained from the core layer will be described.

The adaptive codebook is a dynamic codebook that stores past excitation signals and is updated on a per sub-frame basis. The excitation code virtually corresponds to the base cycle (dimension: time; expressed by number of samples) of the speech signal, which is the coding target, and is coded by analyzing the long-term correlation between the input speech signal (such as input speech 301 or difference signal 308) and synthetic signal. In the enhancement layer, difference signal 308 is coded, then the long-term correlation of the core layer remains in the difference signal as well, enabling more efficient coding with use of the excitation code of the adaptive codebook of the core layer. An example of the method of use is a mode where a difference is coded. This method will now be described in detail.

The excitation code of the adaptive codebook of the core layer is, for example, coded at 8 bits. (For “0 to 255”, actual lag is “20.0 to 147.5” and the samples are indicated in “0.5” increments.) First, to obtain the difference, the sampling rates are first matched. Specifically, given that sampling is performed at 8 kHz in the core layer and at 16 kHz in the enhancement layer, the numbers will match that of the enhancement layer when doubled. Thus, in the enhancement layer, the numbers are converted to samples “40 to 295”. The search conducted in the adaptive codebook of the enhancement layer then searches in the vicinity of the above numbers.

For example, when only the interval comprising 16 candidates before and after the above numbers (up to “−7 to +8”) is searched, efficient coding is achieved at four bits with a minimum amount of calculation. Given that the long-term correlation of the enhancement layer is similar to that of the core layer, sufficient performance is also achieved.

Specifically, for instance, given an excitation code “20” of the adaptive codebook of the core layer, the number becomes “40” which matches “80” in the enhancement layer. Thus, “73 to 88” are searched at 4 bits. This is equivalent to the code of “0 to 15” and, if the search result is “85”, “12” becomes the excitation code of the adaptive codebook of the enhancement layer.

In this manner, efficient coding is made possible by coding the difference of the excitation code of the adaptive codebook of the core layer.

One example of how to utilize the excitation code of the adaptive codebook of the core layer is using the code as is when further economization of the number of bits of the enhancement layer is desired. In this case, the excitation code of the adaptive codebook is not required (number of bits: “0”) in the enhancement layer.

Next, the method of use of the gain parameter obtained from the core layer will be described in detail.

In the core layer, the parameter applied as the multiplicand of the excitation samples is coded as information indicating power. The parameter is coded based on the relationship between the synthetic signals of the final two excitation samples (excitation sample from adaptive codebook 552 and excitation sample from stochastic codebook 553) obtained in the above-mentioned parameter coding section 557, and difference signal 308. Here, the case where the two excitation gains are quantized by VQ (vector quantization) will be described as an example.

First, the fundamental algorithm will be described.

When the gains are determined, coding distortion E is expressed using the following equation (12):

$$E=\sum_{i}(Xi-ga\cdot SAi-gs\cdot SSi)^2 \qquad \text{[Equation 12]}$$

Xi: Input speech B18, ga: Gain of synthetic signal of excitation samples of adaptive codebook SAi: Synthetic signal of excitation samples of adaptive codebook Ga: Gain of synthetic signal of excitation samples of adaptive codebook SSi: Synthetic signal of excitation samples of adaptive codebook Thus, given the ga and gs vectors (gaj, gsj) [where j is the index (code) of the vector], the value Ej obtained by subtracting the power of difference signal 308 (Xj) from the coding distortion of index j can be modified as shown in equation (13) below. Thus, the gains are vector quantized by calculating XA, XS, AA, SS, and AS of equation (13) in advance, substituting (gaj, gsj), finding Ej, and then finding j where this value is minimized.

$$Ej=-2\cdot gaj\cdot XA-2\cdot gsj\cdot XS+gaj^2\cdot AA+gsj^2\cdot SS+2\cdot gaj\cdot gsj\cdot AS \qquad \text{[Equation 13]}$$

-continued $$XA = \sum_i Xi \cdot Ai$$

$$XS = \sum_i Xi \cdot Si$$

$$AA = \sum_i Ai \cdot Ai$$

$$SS = \sum_i Si \cdot Si$$

$$AS = \sum_i Ai \cdot Si$$

The above is the method for VQ of the gains of two excitations.

To even more efficiently code the excitation gains, a method that employs parameters of high correlation to eliminate redundancy is typically used. The parameters conventionally used are the gain parameters decoded in the past. The power of the speech signal moderately changes in an extremely short period of time, and thus exhibits high correlation with the decoded gain parameters located nearby temporally. Here, efficient quantization can be achieved based on difference or prediction. In the case of VQ, decoded parameters or the centroid itself are used to perform difference and prediction calculations. The former offers high quantization accuracy, while the latter is highly resistant to transmission errors. "Difference" refers to finding the previous decoded parameter difference and quantizing that difference, and "prediction" refers to finding a prediction value from several previously decoded parameters, finding the prediction value difference, and quantizing the result.

For difference, equation (14) is substituted in the section of ga, gs of equation (12). Subsequently, a search for the optimal j is conducted.

$$ga:gaj+\alpha \cdot Dga \qquad \text{[Equation 14]}$$

$$gs:gsj+\beta \cdot Dgs$$

(gaj,gsj): Centroid of index (code) j

α, β: Weighting coefficients

Dga, Dgs: Previous decoded gain parameters (decoded values or centroids)

The above weighting coefficients α and β are either statistically found or fixed to one. The weighting coefficients may be found by learning based on sequential optimization of the VQ codebook and weighting coefficients. That is, the following procedure is performed:

(1) Both weighting coefficients are set to 0 and many optimal gains (calculated gains that minimize error; found by solving the two dimensional simultaneous equations obtained by equating to zero the equation that partially differentiates equation (12) using ga, gs) are collected, and a database is created.

(2) The codebook of the gains for VQ is found using the LBG algorithm, etc.

(3) Coding is performed using the above codebook, and the weighting coefficients are found. Here, the weighting coefficients are found by solving the simultaneous linear algebraic equations obtained by equating to zero the equation obtained by substituting equation (14) for equation (12) and performing partial differentiation using α and β.

(4) Based on the weighting coefficients of (3), the weighting coefficients are narrowed down by repeatedly performing VQ and converging the weighting coefficients of the collected data.

(5) The weighting coefficients of (4) are fixed, VQ is conducted on many speech data, and the difference values from the optimal gains are collected to create a database.

(6) The process returns to Step (2).

(7) The process up to Step (6) is performed several times to converge the codebook and weighting coefficients, and then the learning process series is terminated.

This concludes the description of the coding algorithm by VQ based on the difference from the decoded gain parameter.

When the gain parameter obtained from the core layer is employed in the above method, the substituted equation is the following equation (15):

$$ga:gaj+\alpha \cdot Dga+\gamma \cdot Cga \qquad \text{[Equation 15]}$$

$$gs:gsj+\beta \cdot Dgs+\delta \cdot Cgs$$

(gaj.gsj): Centroid of index (code) j

α, β, γ, ϵ: Weighting coefficients

Dga, Dgs: Previous decoded gain parameters (decoded values or centroids)

Cga, Cgs: Gain parameters obtained from core layer One example of a method used to find the weighting coefficients in advance is following the method used to find the gain codebook and weighting coefficients α and β described above. The procedure is indicated below.

(1) All four weighting coefficients are set to 0, many optimal gains (calculated gains that minimize error; found by solving the two dimensional simultaneous linear equations obtained by equating to zero the equation that partially differentiates equation (12) using ga, gs), and a database is created.

(2) The codebook of the gains for VQ is found using the LBG algorithm, etc.

(3) Coding is performed using the above codebook, and the weighting coefficients are found. Here, the weighting coefficients are found by solving the simultaneous linear algebraic equations obtained by equating to zero the equation obtained by substituting equation (15) for equation (12) and performing partial differentiation using α, β, γ, and δ.

(4) Based on the weighting coefficients of (3), the weighting coefficients are narrowed down by repeatedly performing VQ and converging the weighting coefficients of the collected data.

(5) The weighting coefficients of (4) are fixed, VQ is conducted on many speech data, and the difference values from the optimal gains are calculated to create a database.

(6) The process returns to Step (2).

(7) The process up to Step (6) is performed several times to converge the codebook and weighting coefficients, and then learning process series is terminated.

This concludes the description of the coding algorithm by VQ based on the difference between the decoded gain parameter and the gain parameter obtained from the core layer. This algorithm utilizes the high degree of correlation of the parameters of the core layer, which are parameters of the same temporal period, to more accurately quantize the gain information. For example, in a section comprising the beginning of the first part of a word of speech, prediction is not possible using past parameters only. However, the rise of the power at that beginning is already reflected in the gain parameter obtained from the core layer, making use of that parameter effective in quantization.

The same holds true in cases where "prediction (linear prediction)" is employed. In this case, the only difference is that the equation of α and β becomes an equation of several past decoded gain parameters [equation (16) below], and a detailed description thereof is therefore omitted.

$$ga: gaj + \alpha k \cdot \sum_k Dgak + \gamma \cdot Cga$$ [Equation 16]

$$gs: gsj + \beta k \cdot \sum_k Dgsk + \delta \cdot Cgs$$

(gaj.gsj): Centroid of index (code) j

α, β, γ, δ: Weighting coefficients

Dgak, Dgsk: Decoded gain parameters (decoded values or centroids) before k

Cga, Cgs: Gain parameters obtained from core layer

In this manner, parameter coding section 557 (gain adjustment section 554), also utilizes in gain adjustment section 554 the gain parameter obtained from the core layer in the same manner as adaptive codebook 552 and LPC analyzing section 554 to achieve efficient quantization.

While the above description used gain VQ (vector quantization) as an example, it is clear that the same effect can be obtained with scalar quantization as well. This is because, in the case of scalar quantization, easy derivation from the above method is possible since indices (codes) of the gain of the excitation samples of the adaptive codebook and the gain of the excitation samples of the stochastic codebook are independent, and the only difference from VQ is the index of the coefficient.

At the time the gain codebook is created, the gain values are often converted and coded taking into consideration that the dynamic range and order of the gains of the excitation samples of the stochastic codebook and the gains of the excitation samples of the adaptive codebook differ. For example, one method used employs a statistical process (such as LBG algorithm) after logarithmic conversion of the gains of the stochastic codebook. When this method is used in combination with the scheme of coding while taking into consideration the variance of two parameters by finding and utilizing the average and variance, coding of even higher accuracy can be achieved.

Furthermore, the LPC synthesis during the excitation search of LPC synthesizing section 555 typically uses a linear predictive coefficient, high-band enhancement filter, or an auditory weighting filter with long-term prediction coefficients (which are obtained by the long-term prediction analysis of the input signal).

In addition, while the above-mentioned comparison section 556 compares all excitations of adaptive codebook 552 and stochastic codebook 553 obtained from gain adjustment section 554, typically—in order to conduct the search based on a practical amount of calculations—two excitations (adaptive codebook 552 and stochastic codebook 553) are found using a method requiring a smaller amount calculations. In this case, the procedure is slightly different from the function block diagram of FIG. 5. This procedure is described in the description of the fundamental algorithm (coding apparatus) of CELP based on FIG. 1, and therefore is omitted here.

Figure 6:
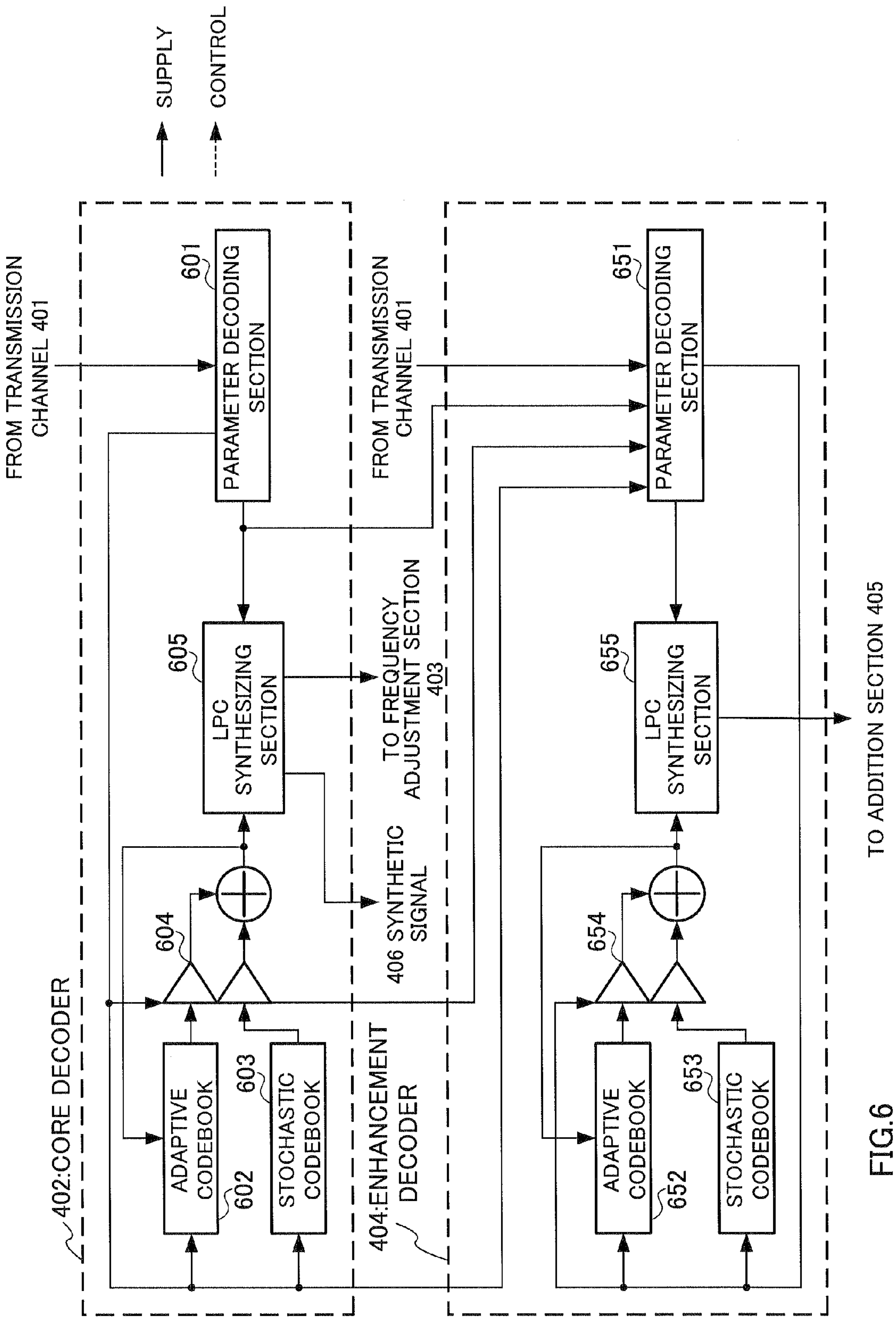
FIG. 6 is a block diagram showing the internal configuration of the core decoder and enhancement decoder of the decoding apparatus of the scalable codec according to the above-mentioned embodiment of the present invention.

Next, the method wherein the enhancement decoder of the decoding apparatus utilizes the parameters obtained from the core decoder according to the present embodiment will be described with reference to FIG. 6. FIG. 6 is a block diagram showing the configuration of core decoder 402 and enhancement decoder 404 of the scalable codec decoding apparatus of FIG. 4.

First, the function of core decoder 402 will be described. Parameter decoding section 601 obtains the LPC code, excitation codes of the two codebooks, and gain code from transmission channel 401. Then, parameter decoding section 601 decodes the LPC code to obtain the LPC parameter for synthesis, and sends the parameter to LPC synthesizing section 605 and parameter decoding section 651 in enhancement decoder 404. In addition, parameter decoding section 601 sends the two excitation codes to adaptive codebook 602 and stochastic codebook 603, and specifies the excitation samples to be output. Parameter decoding section 601 further decodes the gain code to obtain the gain parameter, and sends the parameter to gain adjustment section 604.

Next, adaptive codebook 602 and stochastic codebook 603 send the excitation samples specified by the two excitation codes to gain adjustment section 604. Gain adjustment section 604 multiplies the gain parameter obtained from parameter decoding section 601 by the excitation samples obtained from the two excitation codebooks and then adds the products to find the total excitations, and sends the excitations to LPC synthesizing section 605. In addition, gain adjustment section 604 stores the total excitations in adaptive codebook 602. At this time, the old excitation samples are discarded. That is, the decoded excitation data of adaptive codebook 602 are subjected to a memory shift from future to past, the old data that does not fit into memory are discarded, and the excitation signal created by decoding is stored in the emptied future section. This process is referred to as an adaptive codebook status update. LPC synthesizing section 605 obtains the LPC parameter for synthesis from parameter decoding section 601, and filters the total excitations with the LPC parameter for synthesis to obtain a synthetic signal. The synthetic signal is sent to frequency adjustment section 403.

Furthermore, to ensure easy listenability, combined use with a post filter that filters the synthetic signal with the LPC parameter for synthesis and the gain of the excitation samples of the adaptive codebook, for instance, is effective. In this case, the obtained output of the post filter is output as synthetic signal 406.

Based on the above function of core decoder 402, three types of parameters, i.e., the LPC parameter for synthesis, excitation code of the adaptive codebook, and gain parameter, are sent to enhancement decoder 404.

Next, the function of enhancement decoder 404 that receives the three types of parameters will be described.

Parameter decoding section 651 obtains the synthesized LPC parameter, excitation codes of the two codebooks, and gain code from transmission channel 401. Then, parameter decoding section 651 decodes the LPC code to obtain the LPC parameter for synthesis, and sends the LPC parameter to LPC synthesizing section 655. In addition, parameter decoding section 651 sends the two excitation codes to adaptive codebook 652 and stochastic codebook 653, and specifies the excitation samples to be output. Parameter decoding section 651 further decodes the final gain parameter based on the gain parameter obtained from the core layer and the gain code, and sends the result to gain adjustment section 654.

Next, adaptive codebook 652 and stochastic codebook 653 output and send the excitation samples specified by the two excitation indices to gain adjustment section 654. Gain adjustment section 654 multiplies the gain parameter obtained from parameter decoding section 651 by the excitation samples obtained from the two excitation codebooks and then adds the products to obtain the total excitations, and sends the total excitations to LPC synthesizing section 655. In addition, the total excitations are stored in adaptive codebook 652. At this time, the old excitation samples are discarded. That is, the decoded excitation data of adaptive codebook 652 are subjected to a memory shift from future to past, the old data that does not fit into memory are discarded, and the excitation signal created by decoding is stored in the emptied future section. This process is referred to as an adaptive codebook status update.

LPC synthesizing section 655 obtains the final decoded LPC parameter from parameter decoding section 651, and filters the total excitations with the LPC parameter to obtain a synthetic signal. The obtained synthetic signal is sent to addition section 405. Furthermore, after this synthesis, a post filter based on the same LPC parameter is typically used to ensure that the speech exhibits easy listenability.

Next, utilization of each of the three parameters (synthesized LPC parameter, excitation code of adaptive codebook, and gain parameter) obtained from the core layer in enhancement decoder 404 will be individually described.

First, the decoding method of parameter decoding section 651 that is based on the synthesized LPC parameter will be described in detail.

Parameter decoding section 651, typically based on prediction using past decoded parameters, first decodes the LPC code into a parameter that is readily quantized, such as PARCOR coefficient, LSP, or ISP, and then converts the parameter to coefficients used in synthesis filtering. The LPC code of the core layer is also used in this decoding.

In the present embodiment, frequency scalable codec is used as an example, and thus the LPC parameter for synthesis of the core layer is first converted taking into consideration the difference in frequency. As stated in the description of the decoder of FIG. 4, given core layer 8 kHz sampling and enhancement layer 16 kHz sampling as an example of a core layer and enhancement layer having different frequency components, the synthesized LPC parameter obtained from the speech signal of 8 kHz sampling needs to be changed to 16 kHz sampling. The method used is described in detail in the description of the coding apparatus using equation (6) from equation (3) of LPC analyzing section 551, and a description thereof is therefore omitted.

Then, parameter decoding section 651 uses the parameter of the core layer found from the above conversion (hereinafter "core coefficient") to decode the LPC coefficients. The LPC coefficients were coded by vector quantization (VQ) in the form of a parameter that is readily quantized such as PARCOR or LSP, and is therefore decoded according to this coding. Here, similar to the coding apparatus, the following two quantization modes will be described as examples.

(1) Coding the difference from the core coefficient (2) Including the core coefficient and coding using predictive VQ First, in the quantization mode of (1), decoding is performed by adding the difference vectors obtained by LPC code decoding (decoding coded code using VQ, predictive VQ, split VQ, or multistage VQ) to the core coefficient. At this time, while a simple addition method is also effective, in a case where quantization based on addition/subtraction according to each vector element and the correlation thereof is used, a corresponding addition process is performed. An example is shown in equation (17) below.

$$Oi = Di + \beta i \cdot Yi \qquad \text{[Equation 17]}$$

Oi: Decoded vector, Di: Decoded difference vector,

Yi: Core coefficient

βi: Degree of correlation

In the above equation (17), βi uses a stored value statistically found in advance. This degree of correlation is the same value as that of the coding apparatus. Thus, because the method for finding this value is exactly the same as that described for LPC analyzing section 551, a description thereof is omitted.

In the quantization mode of (2), a plurality of decoded parameters decoded in the past are used, and the sum of the products of these parameters and a fixed prediction coefficient are added to decoded difference vectors. This addition is shown in equation (18).

$$Oi = Di + \sum_{m} \delta m, i \cdot Ym, i \qquad \text{[Equation 18]}$$

Oi: Decoded vector, Di: Decoded difference vector

Ym, i: Past decoded parameters

δm, i: Prediction coefficients (fixed)

For the above "decoded parameters of the past," two methods are available: a method using the actual decoded vectors decoded in the past, or a method using the centroid of VQ (in this case, the difference vectors decoded in the past). Here, similar to the coder, because the core coefficient also exhibits a high degree of correlation with the parameters at that time, always including the core coefficient in Ym, i makes it possible to obtain high prediction capability and decode vectors at an accuracy level that is even higher than that of the quantization mode of (1). For example, when the centroid is used, the equation will be the same as equation (11) used in the description of the coding apparatus (LPC analyzing section 551) in the case of prediction order 4.

In this manner, use of the core coefficient obtained in the core layer enables efficient LPC parameter decoding.

Next, the method of use of the excitation codes of the adaptive codebook obtained from the core layer will be described. The method of use will be described using difference coding as an example, similar to the coding apparatus.

The excitation codes of the adaptive codebook are decoded to obtain the difference section. In addition, the excitation codes from the core layer are obtained. The two are then added to find the index of adaptive excitation.

Based on this example, a description will now be added. The excitation codes of the adaptive codebook of the core layer are coded, for example, at 8 bits (for "0 to 255," "20.0 to 147.5" are indicated in increments of "0.5"). First the sampling rates are matched. Specifically, given that sampling is performed at 8 kHz in the core layer and at 16 kHz in the enhancement layer, the numbers change to "40 to 295", which match that of the enhancement layer, when doubled. Then, the excitation codes of the adaptive codebook of the enhancement layer are, for example, 4-bit codes (16 entries "−7 to +8"). Given an excitation code of "20" of the adaptive codebook of the core layer, the number changes to "40", which matches "80" in the enhancement layer. Thus, if "12" is the excitation code of the adaptive codebook of the enhancement layer, "80+5=85" becomes the index of the final decoded adaptive codebook.

In this manner, decoding is achieved by utilizing the excitation codes of the adaptive codebook of the core layer.

One example of how to utilize the excitation code of the adaptive codebook of the core layer is using the code as is when the number of bits of the enhancement layer is highly restricted. In this case, the excitation code of the adaptive codebook is not required in the enhancement layer.

Next, the method used to find the gain of parameter decoding section 651 that is based on gain parameters will be described in detail.

In the description of the coding apparatus, "difference" and "prediction" were used as examples of methods for employing parameters with high correlation to eliminate redundancy.

Here, in the description of the decoding apparatus, the decoding methods corresponding to these two methods will be described.

The two gains ga and gs when "difference" based decoding is performed are found using the following equation (19):

$$ga=gaj+\alpha\cdot Dga+\gamma\cdot Cga \quad \text{[Equation 19]}$$

$$gs=gsj+\beta\cdot Dgs+\delta\cdot Cgs$$

j: Gain decoding obtained by enhancement decoder 44 (equivalent to index in the case of this VQ)

(gaj, gsj): Centroid of index (code) j

α, β, γ, δ: Weighting coefficients

Dga, Dgs: Previous decoded gain parameters (decoded values or centroids)

Cga, Cgs: Gain parameters obtained from core layer

The above-mentioned weighting coefficients are the same as those of the coder, and are either fixed in advance to appropriate values or set to values found through learning. The method used to find the values through learning is described in detail in the description of the coding apparatus, and therefore a description thereof is omitted.

The same holds true in cases where coding is performed based on "prediction (linear prediction)" as well. In this case, the only difference is that the equation of α and β changes to an equation based on several decoded gain parameters of the past[shown in equation (20) below] and thus the decoding method can be easily reasoned by analogy from the above-mentioned description, and a detailed description thereof is therefore omitted.

$$ga = gaj + \alpha k \cdot \sum_k Dgak + \gamma \cdot Cga \quad \text{[Equation 20]}$$

$$gs = gsj + \beta k \cdot \sum_k Dgsk + \delta \cdot Cgs$$

j: Gain decoding obtained by enhancement decoder 44 (equivalent to index in the case of this VQ)

(gaj.gsj): Centroid of index (code) j

α, β, γ, δ: Weighting coefficients

Dgak, Dgsk: Decoded gain parameters (decoded values or centroids) before k

Cga, Cgs: Gain parameters obtained from core layer

While the above-mentioned description uses gain VQ as an example, decoding is possible using the same process with gain scalar quantization as well. This corresponds to cases where the two gain codes are independent; the only difference is the index of the coefficients in the above-mentioned description, and thus the decoding method can be easily reasoned by analogy from the above-mentioned description.

As described above, the present embodiment effectively utilizes information obtained through decoding lower layer codes in upper layer enhancement coders, achieving high performance for both component type scalable codec as well as multistage type scalable codec, which conventionally lacked in performance.

The present invention is not limited to multistage type, but can also utilize the information of lower layers for component type as well. This is because the present invention does not concern the difference in input type.

In addition, the present invention is effective even in cases that are not frequency scalable (i.e., in cases where there is no change in frequency). With the same frequency, the frequency adjustment section and LPC sampling conversion are simply no longer required, and descriptions thereof may be omitted from the above explanation.

The present invention can also be applied to systems other than CELP. For example, with audio codec layering such as ACC, Twin-VQ, or MP3 and speech codec layering such as MPLPC, the same description applies to the latter since the parameters are the same, and the description of gain parameter coding/decoding of the present invention applies to the former.

The present invention can also be applied with scalable codec of two layers or more. Furthermore, the present invention is applicable in cases where information other than LPC, adaptive codebook information, and gain information is obtained from the core layer. For example, in the case where SC excitation vector information is obtained from the core layer, clearly, similar to equation (14) and equation (17), the excitation of the core layer may be multiplied by a fixed coefficient and added to excitation candidates, with the obtained excitations subsequently synthesized, searched, and coded as candidates.

Furthermore, while the present embodiment described a case where a speech signal is that target input signal, the present invention can support all signals other than speech signals as well (such as music, noise, and environmental sounds).

The present application is based on Japanese Patent Application No. 2004-256037, filed on Sep. 2, 2004, the entire content of which is expressly incorporated by reference herein.

Industrial Applicability

The present invention is ideal for use in a communication apparatus of a packet communication system or a mobile communication system.

The invention claimed is:

1. A speech encoding apparatus that encodes an input signal using encoded information of n layers, n being an integer greater than or equal to 2, the speech encoding apparatus comprising:

a base layer encoder that encodes the input signal to generate the encoded information of layer 1;

a decoder of layer i that decodes the encoded information of layer i , i being an integer greater than 1 and less than or equal to n−1, to generate a decoded signal of layer i;

an adder, comprising a processor, that adds either a difference signal of layer 1 which is a difference between the input signal and the decoded signal of layer 1 or a difference signal of layer i which is a difference between the decoded signal of layer i−1 and the decoded signal of layer i; and an enhancement layer encoder of layer i+1 that encodes the difference signal of layer i to generate encoded information of layer i+1;

wherein the enhancement layer encoder of layer i+1 performs an encoding process utilizing decoding parameters received separately from the difference signal and from a decoding section of layer j, j being an integer less than or equal to i and obtained in the decoding process of the decoding section of layer j.

2. A speech encoding apparatus according to claim 1 wherein the enhancement layer encoder of layer i+1 is a CELP type encoder that utilizes LPC parameter information obtained through decoding in the decoding section of layer j.

3. A speech encoding apparatus according to claim 1 wherein the enhancement layer encoder of layer i+1 is a CELP type encoder that utilizes information of an adaptive codebook obtained through decoding in the decoder of layer j.

4. A speech encoding apparatus according to claim 1 wherein the enhancement layer encoder of layer i+1 is a CELP type encoder that utilizes gain information obtained through decoding in the decoder of layer j.

5. A speech decoding apparatus that decodes encoded information of n layers, n being an integer greater than or equal to 2, the speech decoding apparatus comprising:

a base layer decoder that decodes the inputted encoded information of layer 1;

a decoder of layer i that decodes the encoded information of layer i+1, i being an integer greater than 1 and less than or equal to n+1, to generate a decoded signal of layer i+1; and an adder, comprising a processor, that adds the decoded signal of each layer, wherein the decoder of layer i+1 performs a decoding process utilizing decoding parameters received separately from the encoded information of layer i+1 and from a decoder of layer j, j being an integer less than or equal to i and obtained in a decoding process of the decoder of layer j.

6. A speech decoding apparatus according to claim 5 wherein the decoder of layer i+1 is a CELP type decoder that utilizes LPC parameter information obtained through decoding in the decoder of layer j.

7. A speech decoding apparatus according to claim 5 wherein the decoder of layer i+1 is a CELP type decoder that utilizes information of an adaptive codebook obtained through decoding in the decoder of layer j.

8. A speech decoding apparatus according to claim 5 wherein the decoder of layer i+1 is a CELP type decoder that utilizes gain information obtained through decoding in the decoder of layer j.

9. A speech encoding method that encodes input signals using the encoded information of n layers, n being an integer greater than or equal to 2, the speech encoding method comprising:

a base layer encoding process that encodes the input signal to generate the encoded information of layer 1, a decoding process of layer i that decodes the encoded information of layer i, i being an integer greater than 1 and less than or equal to n−1 to generate the decoded signal of layer i;

an addition process that either determines a difference signal of layer 1 which is a difference between the input signal and the decoded signal of layer 1 or a difference signal of layer i which is a difference between the decoded signal of layer i−1 and the decoded signal of layer i; and an enhancement layer encoding process of layer i+1 that encodes the difference signal of layer i to generate encoded information of layer i+1;

wherein the enhancement layer encoding process of layer i+1 an encoding process utilizing decoding parameters received separately from the difference signal and from a decoding process of layer j, j being an integer less than or equal to i and obtained in the decoding process of layer j.

10. A speech decoding method that decodes encoded information of n layers, n being an integer greater than or equal to 2, the speech decoding method comprising:

a base layer decoding process that decodes the inputted encoded information of layer 1;

a decoding process of decoding encoded information of layer i+1, i being an integer greater than 1 and less than or equal to n−1 to generate a decoded signal of layer i+1; and an addition process that adds the decoded signal of each layer;

wherein the decoding process of layer i+1 performs a decoding process utilizing decoding parameters received separately from the encoded information of layer i+1 and from a decoding process of layer j, j being an integer less than or equal to i and obtained in the decoding process of layer j.

* * * * *

UNITED STATES PATENT AND TRADEMARK OFFICE

CERTIFICATE OF CORRECTION

PATENT NO. : 8,364,495 B2
APPLICATION NO. : 11/574543
DATED : January 29, 2013
INVENTOR(S) : Toshiyuki Morii et al.

It is certified that error appears in the above-identified patent and that said Letters Patent is hereby corrected as shown below:

On the Title Page

Item (75) Inventors incorrectly reads:

"Toshiyuki Morii, Osaka (JP)"

and should read:

"Toshiyuki Morii, Kanagawa (JP)".

Item (56) References Cited, Other Publications, page 2, right column, lines 3-6 incorrectly read:

"T. Moria, et al.;, "MPEG-4 TwinVQ ni yoru Ayamari Taisei Scalable Fugoka", Informational Procesbing Society Of Japan Kenkyu Hokoki, [MUSic and computer 34-7], vol. 2000, No. 19, pp. 41-46, Feb. 17, 2000."

and should read:

"T. Moriya, et al., "MPEG-4 TwinVQ ni yoru Ayamari Taisei Scalable Fugoka", Informational Processing Society of Japan Kenkyu Hokoku, [MUSic and computer 34-7], Vol. 2000, No. 19, pp. 41-46, Feb. 17, 2000.".

Item (56) References Cited, Other Publications, page 2, right column, line 19 incorrectly reads:

"Turkey, Jun. 5, 2000, pp. 1145-1146."

Signed and Sealed this
Sixteenth Day of September, 2014

Michelle K. Lee
*Deputy Director of the United States Patent and Trademark Office* and should read:

"Turkey, Jun. 5, 2000, pp. 1145-1148.".

In the Claims

Claim 1, column 22, line 42 incorrectly reads:

"an adder, comprising a processor, that adds either a differ-"

and should read:

"an adder, comprising a processor, that determines either a differ-".

Claim 9, column 24, line 15 incorrectly reads:

"i+1 an encoding process utilizing decoding parameters"

and should read:

"i+1 performs an encoding process utilizing decoding parameters".